No. 678,534.
C. A. BENNETT.
VALVE FOR FLUID COMPRESSORS AND ENGINES.
(Application filed July 15, 1898.)
Patented July 16, 1901.
(No Model.)
2 Sheets—Sheet 1.
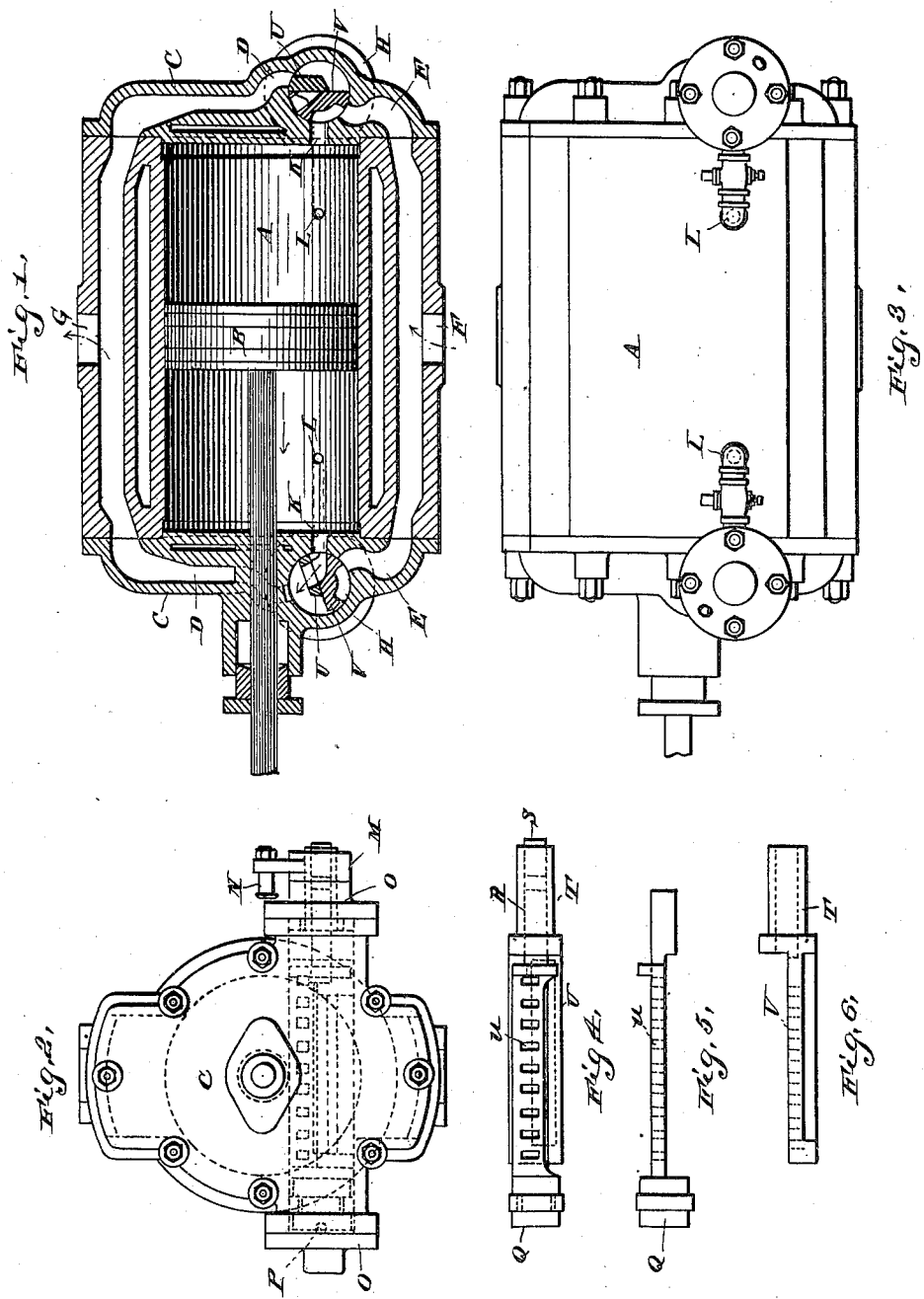
Witnesses:
Inventor:

No. 678,534. Patented July 16, 1901.
C. A. BENNETT.
VALVE FOR FLUID COMPRESSORS AND ENGINES.
(Application filed July 15, 1898.)
(No Model.) 2 Sheets—Sheet 2.
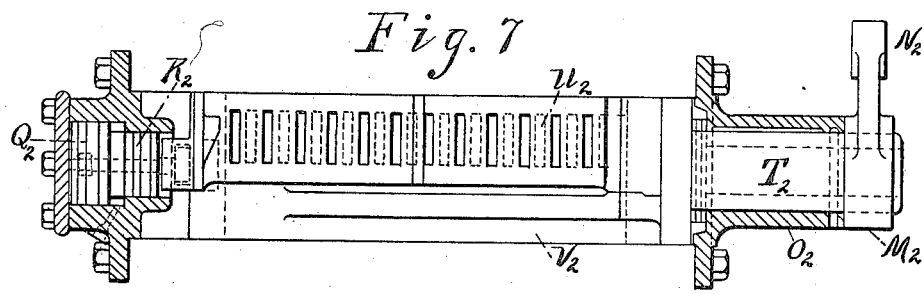
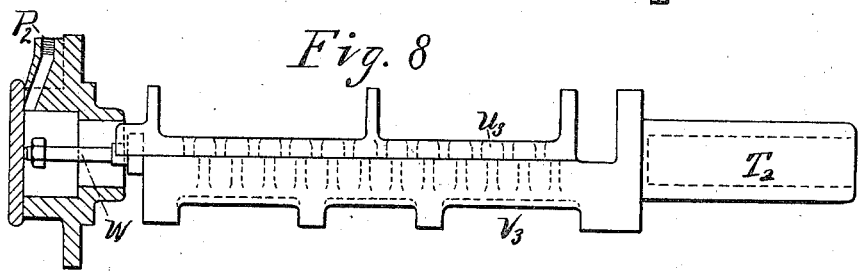
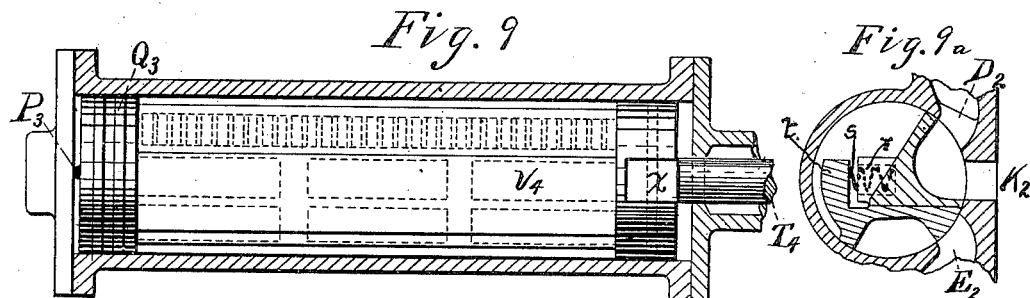 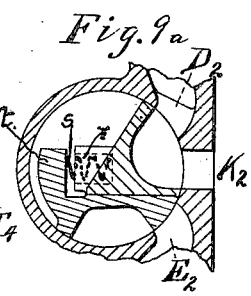
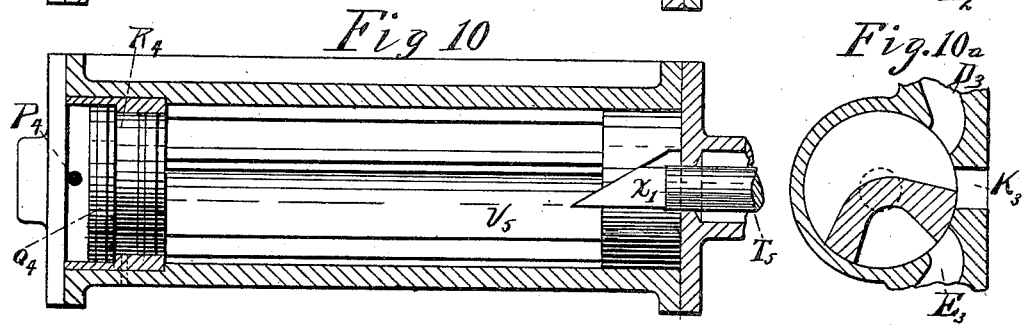 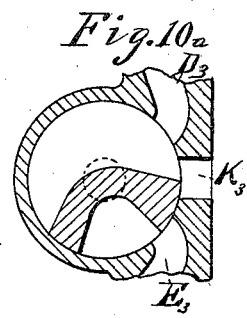
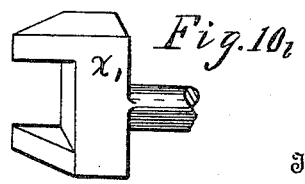
Witnesses
Inventor
Chas. A. Bennett

UNITED STATES PATENT OFFICE.

CHARLES A. BENNETT, OF DOVER, NEW JERSEY.

VALVE FOR FLUID COMPRESSORS AND ENGINES.

SPECIFICATION forming part of Letters Patent No. 678,534, dated July 16, 1901.

Application filed July 15, 1898. Serial No. 686,076. (No model.)

*To all whom it may concern:*

Be it known that I, CHARLES A. BENNETT, of Dover, in the county of Morris and State of New Jersey, have invented new and useful Improvements in Valves for Fluid Compressors and Engines, which improvements are fully set forth in the following specification, reference being had to the accompanying drawings.

The object of my invention is to produce a more efficient compressor or steam-engine in economy, durability, and simplicity, and is accomplished by the arrangement of ports K D E and valves V U in the cylinder-heads, as shown, in longitudinal section of cylinder, Figure 1, in which it is also shown that the valves V in each head are made to oscillate upon the ports K and E and seats thereof. The multiported valve U, resting upon the back of valve V, is made to slide thereon, opening and closing the corresponding passage in valve V. Plan and side elevation of these valves are shown in Figs. 4, 5, and 6. Plan of cylinder-heads C, containing said valves, is shown in Fig. 2, in which N is the crank-pin of crank-arm M, which is attached to the hollow valve-stem T. The valve V, therefore, is made to oscillate by means of suitable rod connection at pin N. A more general idea of the character of the operation and effect of these valves may be had if the general knowledge of ordinary oscillating valves, such as those known as the "Corliss," now in general use, is borne in mind. In such designs four oscillating valves and four cylinder-ports are necessary. In my design two oscillating valves and two short cylinder-ports only are required. The multiported valves U assuming the functions of the oscillating cut-off valves in the familiar construction an important advantage is therefore gained, because the clearance-space is less and the operating mechanism less intricate and expensive. Moreover, as a compressor this combination of admission and discharge valves besides reducing wasteful clearance permits of a cooling-water chamber extending over a greater portion of the cylinder-heads. The economical effect of ample cooling-surface is well known. Some compressors have been constructed in which four oscillating valves are used—two for induction and two for discharge; but in these there cannot be such effective cooling-chamber in the heads. They also necessarily multiply clearance, by reason of more ports and operating mechanism. Others have been made in which two oscillating induction-valves and a number of puppet discharge-valves are used. They are subject to the same objections as the other by comparison with my device. It is also well known that in the compression of air and gases it is extremely desirable that discharge should take place at the instant compression within the cylinder has attained to the same degree as that within the pipes or reservoir into which the air is conveyed or stored. The valves as I arrange them permit this to be done. Hence while neither the oscillating nor multiported sliding valve may be new the combination of them and operating apparatus, together with the ports K E D or modifications thereof, form a novelty, some advantages of which have been stated.

When used as a steam-engine, the multiported valve U is made to act as the steam admission and cut-off and is operated by steam or any suitable mechanism. In this case oscillating valve V acts as the exhaust, direction of travel then being opposite that indicated by the arrows, Fig. 1, steam entering at G and exhausting at F, (the direction, as indicated by the arrows, is that when the device is used for air compression,) for steam the only change being in the position of crank-pin N or the operating-eccentric, which for the conditions of a steam-engine would be opposite that as when for compression. In one case the operating-eccentric would be at about ninety degrees in advance of the engine-crank. In the other it would be ninety degrees back of the engine-crank, or the valve crank and pin N would be placed exactly the opposite position in one case as it would be for the other. For either purpose the valves oscillate back and forth to the extreme position shown at right and left hand cylinder-heads in the drawings, carrying the multiported valve with it.

Supplementing the above general plan and the objects of my invention by reference to the drawings and description thereof, a better understanding of the construction may be had and in which it will be seen that there are several modifications all accomplishing the same results and which are pointed out in the claims forming part hereof.

Fig. 1 is a longitudinal section of a compressing-cylinder and heads, showing water-cooling chamber Y and also cross-section of valves V and U. Fig. 2 is a plan view of heads, showing the valves in dotted lines. Fig. 3 is a side elevation of the cylinder and heads. Figs. 4, 5, and 6 are plan and side elevations of valves V and U. Figs. 7 and 8 are plan and side elevations of similar valves, on a larger scale, and also showing a differential piston for operating the multiported valve. Figs. 9 and $9^a$ are a plan and section of one modification in which the whole valve is made to have an end movement for discharge as well as to oscillate. Figs. 10 and $10^a$ are a plan and section showing another modification of operating-valve V and in which there is no multiported valve, the same object being accomplished by oscillating an end movement upon the same port arrangement as for the others; Fig. $10^b$, the forked T-head for valve shown in Fig. 10.

Like letters of reference indicate the same parts throughout all the drawings.

In cylinder A, Fig. 1, the piston B is at mid-stroke and valve V at right-hand end has fully-opened ports E and K for inlet from chamber F, piston B moving to the left, compressing the air that has been entrapped by closure of valve V at left-hand end. The discharge-passage of this valve is now in position on port K and, as shown, the sliding valve U has opened for passage of compressed air from cylinder to port D and chamber G.

As before stated, the valves are oscillated to the extreme positions shown at the two ends, Fig. 1, by means of crank-and-rod connection. The opening of valve U for discharge is accomplished by means of compressed air in the cylinder A entering through the small ports and pipes L, the other end P of these pipes being connected to the large cylinder of a differential piston Q on end of valves U, as shown in the several views thereof. When piston B has reached the end of stroke, then valve V has been moved back, so that closing edge of its discharge-passage has just closed port K, and port L has been just uncovered by piston B, so that then the air lying against the larger part of differential piston Q reënters cylinder A at opposite or free air side. The valve-piston being relieved thereby of air on one side permits valve U to close on valve V. By the returning stroke of piston B the operation is repeated at the other end, oscillating valves V admitting the air to be compressed and the sliding valve at the opposite end operating at the proper time for discharging it at the desired pressure.

In the valves U V, as shown by Fig. 4, the character of differential piston is somewhat different from the ordinary, the piston Q having equal area on both sides. The inner end, which is attached to valve U, is exposed always to the reservoir-pressure. An equal pressure to that of reservoir-pressure on the outer end at Q from compressing-cylinder A through port and pipe L P would not, therefore, move the valve U, owing to friction thereof on the seat of valve V. Consequently the counter-piston R in the hollow valve-stem T of valve V is provided and attached to valve U, which is of sufficient area to overbalance by subtraction of area from inner side of piston Q equal to friction-load of valve U, there being no pressure on outer end of counter-piston R. An equal pressure from cylinder A to that of reservoir-pressure on outer end of piston Q will then open valve U for discharge of compressed gas. The uncovering of port L by piston B returns valve, operating air from Q to cylinder A. The valves operate in a bored case or cylinder, having heads O O. In the pipes L there is provided an ordinary adjustable check-valve having set-screw to prevent valve from seating or other suitable device for permitting valve U to close without violence, the passage being restricted for discharge back into cylinder A, but full open for inlet to operating-piston Q, allowing sufficient volume to open discharge-valve quickly, providing for free discharge to reservoir. The plug S in valve-stem T is introduced as a stop for piston R and valve U when opened.

In the valves, as shown by Figs. 7 and 8, the differential piston assumes the ordinary form—a large piston $Q^2$ and small piston $R^2$—part of the valve-cylinder head forming the cylinders therefor. The pistons are connected to valve U by means of a round headed bolt W or equivalent thereof, the head fitting into a recess in the end of the valve, which is free to rise from its seat and also to oscillate without turning the piston Q. The pistons $Q^2$ $R^2$ are shown in Fig. 7, but are omitted in Fig. 8 in order to more clearly show the connecting-bolt W. $T^2$ is the stem of valve V. $O^2$ is the bearing; $N^2$ $M^2$, the operating-crank; $P^2$, air-port for pipe L. The operation is the same as described for Fig. 4.

In the valves as shown by Figs. 9 and $9^a$ there is the same arrangement of cylinder-head ports, the discharge-passage $D^2$ being subdivided, as shown by dotted lines on plan, and a section of valve $V^4$ is also multiported, so that an end movement of the entire valve opens and closes a subdivided port $D^2$. This valve is preferably made in two parts, as shown, so that it may adapt itself to possible wear. The upper portion of the valve is let into place between the piston $Q^3$ and the valve-head, which are secured to the lower portion of the valve. Said upper portion may be provided with a recess $r$, within which is placed a coiled spring $s$, bearing against a stiffening-rib $t$ on the lower portion. This spring keeps the upper portion of the valve pressed into contact with the valve-seat at times when there is no pressure in the reservoir. The valve is oscillated by a T-head X of a valve-stem $T^4$, to which the operating-crank is attached. The valve-stem in this modification assumes the function of counter-piston R and hollow stem T in Fig. 4. It is of sufficient area to overbalance by subtracting pressure area from that end equal to friction of the valve, so that the air entering against $Q^3$ at $P^3$ from port L moves the valve and stem, as described for Fig. 4.

In valve V, as shown by Figs. 10 and $10^a$, the ports still remain as in Fig. 1. The section of this valve, Fig. $10^a$, shows it to be in one piece and without auxiliary valve U—in that respect a departure from the others. Still its functions are the same—that of providing for both inlet and a variable discharge by action on ports, as shown throughout, through means described. This valve is operated by stem $T^5$, having the forked T-head $X^2$. The forks have beveled sides fitting into beveled slots of valve-head. These beveled forks and corresponding slots in the valve-head form an inclined plane by which when air entering at $P^4$ forces the valve endwise said valve is revolved by said inclined plane faster than by the normal travel of the valve-stem itself. In the position shown the valve has been advanced for discharge on $K^3$ by means of air from compressing-cylinder through port L, $P^4$ acting on a differential piston $Q^4 R^4$, as described. It will be seen by the character of the slotted end and T-head stem that the travel of stem $T^5$ is intended to carry the valve in the direction of opening for discharge only to a limited extent, and it is left for a piston suitably arranged for the purpose to advance the valve by means of the beveled forks for proper opening, as described, T-head X' being in contact with valve, as shown. The reverse movement of it is so adapted as to bring the discharge edge of valve to upper edge of port $K^3$, thereby closing port when piston has completed its stroke, as previously described.

These several modifications of the valve or valves are introduced to show the importance of the port arrangement, the combination of the ports as arranged with suitable valves adapted for free and continuous inlet during piston's stroke, and at the same time in the one valve having means of variable discharge, substantially as shown. Variable-discharge valves have long been in use; but valves having fixed extent of inlet and variable discharge have not been heretofore combined in the one. Some of the variable-discharge valves in use might readily be converted into both inlet and discharge after the plans or similar to some that I have shown, but using the old methods of operation or still some new system. Such, however, has not been done, and therefore my improvements consist in and of the designs, combinations, and details substantially as set forth.

It is not necessary that the valve-operating pistons which I have described should be confined to the exact form or construction; nor is it necessary that the operating-piston should be attached as shown or to move in the same direction as the valve. The operating-piston may be quite as effective if made to operate at right angles to the valve, connected therewith by a bell-crank, cam, or other suitable attachment instead of by the bolt or stem W. This latter method, however, now appears the most convenient and compact. Neither is it imperative that the variable valve U be constructed exactly as shown. The ports in U and V may be divided otherwise than transversely and, in fact, may be without subdivision, in which event the valve U may be made to move laterally instead of longitudinally, as shown, or may have a movement oblique to the line of port-openings. By a transverse division of the valve discharge-passage in the manner shown the travel of valve U is short and connection with operating-piston simplified.

Whatever the character of discharge-passage of the valve V and its relation to auxiliary valve U, its operation and that portion of it playing upon the cylinder ports and seats should be such as not only to permit free inlet of air or gas for just the entire stroke of piston in compressing-cylinder A, but also to positively close the cylinder-port against the discharged product at the instant that compressing-piston has completed its movement. Such is the case in all the modifications described. This feature is advisable, because then positive closure of discharge at the right time is assured and without dependence upon precise and quick action of differential piston. Moreover, this positive closure of cylinder-port by the valve V reduces the amount of "port-clearance" to that due to cylinder-head port itself. Mechanical closure of valve U might readily be introduced; but it is desirable, to avoid complications that such apparatus would involve.

Referring to the valve V, Fig. 10, and the description thereof and assuming it to have the multiported discharge-passage, as shown in Figs. 7, 8, and 9, it becomes obvious then that the cylinder-port K or a portion of it may be transversely divided to correspond therewith and that a simple end movement of the valve by means of an operating-piston, as described, would insure a proper discharge of compressed product quite as effective as by use of auxiliary valve U; but such arrangement and division of port K would increase the width of it and travel of the valve or increase the clearance or restrict the port-passage. Therefore it is thought not to be so good a modification as the others shown.

The precise arrangement of valve-operating port L and pipe P is not essential, though by the return of valve-operating air to the free side of piston B, through the uncovering of port L by said piston, a twofold advantage is gained. The reëxpanding of this compressed air into the free air at the instant it is entrapped has a refrigerative effect thereon, and also this air then is not added to the clearance of compressing-cylinder A.

In working up this new system or this combined admission and variable discharge valve it became evident that several modifications of the scheme may be made and have been made by me whereby the aforementioned results are retained, and since it is now clear that the system of combining together in the one admission and discharge valves of a compressor, whereby but one cylinder-port in each end is necessary, it would appear to be my privilege to retain to myself the exclusive right to make and use such modifications of the device as I may deem fitting consistent with the principle of said system, as above described.

The essence of the invention consists in employing a valve made in one or more parts which will serve the purposes of both admission and discharge for the cylinder-port and in operating said valve mechanically for one of said purposes and by fluid-pressure for the other purpose. Hence I do not limit myself to the details of construction shown, as it is evident that the mechanism used may be considerably varied without departing from the principle of my invention.

Having thus fully described my invention, I claim—

1. The combination of a cylinder provided with a port or passage for the admission and discharge of fluid; a piston operating in said cylinder; a valve constructed and arranged to serve the purposes of admission and discharge for said port; an actuating-piston connected to said valve; and means for moving said valve mechanically for one of said purposes and by fluid-pressure for the other purpose.

2. The combination of a cylinder provided with a port or passage for the admission and discharge of fluid; a piston operating in said cylinder; a valve constructed and arranged to serve the purposes of admission and discharge for said port; an actuating-piston connected to said valve; means for mechanically operating said valve for one of said purposes; and means for operating said valve-piston by fluid-pressure for the other purpose.

3. The combination of a cylinder provided with a port or passage for the admission and discharge of fluid; a piston operating in said cylinder; a valve constructed and arranged to serve the purposes of admission and discharge for said port; an actuating-piston connected to said valve; means for mechanically operating said valve for one of said purposes; and a pipe or conduit leading from said cylinder to the valve-chamber for operating the valve-piston by fluid-pressure for the other purpose.

4. The combination of a cylinder provided with a port or passage for the admission and discharge of fluid; a piston operating in said cylinder; a valve constructed and arranged to serve the purposes of admission and discharge for said port, and adapted to be both oscillated and reciprocated; means for operating said valve mechanically for one of said purposes; and means for operating said valve by fluid-pressure for the other purpose.

5. The combination of a cylinder provided with a port or passage for the admission and discharge of fluid; a piston operating in said cylinder; a valve constructed and arranged to serve the purposes of admission and discharge for said port or passage; an actuating-piston connected to said valve; means for oscillating said valve for one of said purposes; and means for operating said valve-piston by fluid-pressure for the other purpose.

6. The combination of a cylinder provided with a port or passage for the admission and discharge of fluid; a piston operating in said cylinder; a valve composed of two parts each provided with ports for regulating both admission and discharge through said cylinder-port; means for mechanically operating said valve; and means for operating one part of said valve by fluid-pressure.

7. The combination of a cylinder provided with a port or passage for the admission and discharge of fluid; a piston operating in said cylinder; a valve composed of two parts, for regulating both admission and discharge through said port; means for mechanically operating said valve; an actuating-piston connected to one part; and means for operating said actuating-piston by fluid-pressure.

8. The combination of a cylinder provided with a port or passage for the admission and discharge of fluid; a piston operating in said cylinder; a valve composed of two parts, for regulating both admission and discharge through said port; means for mechanically operating said valve; an actuating-piston connected to one part of the valve; and a pipe or conduit leading from said cylinder to the valve-chamber for operating said actuating-piston by fluid-pressure.

9. The combination of a cylinder provided with a port or passage for the admission and discharge of fluid; a piston operating in said cylinder; a valve composed of two parts, each provided with ports for regulating both admission and discharge through said cylinder-port; means for oscillating said valve; and means for operating one of the parts of said valve by fluid-pressure.

10. The combination of a cylinder provided with a port or passage for the admission and discharge of fluid; a piston operating in said cylinder; a valve composed of two parts for regulating both admission and discharge through said port; means for oscillating said valve; an actuating-piston connected to one of the parts of the valve; and means for operating said actuating-piston by fluid-pressure.

CHAS. A. BENNETT.

Witnesses:
FRANCES Y. AIKEN,
FRANKLIN VAN WINKLE.